UNITED STATES PATENT OFFICE.

E. R. NORNY, OF McDONOUGH, DELAWARE.

IMPROVEMENT IN PRESERVING FRUITS AND VEGETABLES, AND IN COMPOUNDS THEREFOR.

Specification forming part of Letters Patent No. 89,330, dated April 27, 1869.

*To all whom it may concern:*

Be it known that I, E. R. NORNY, of McDonough, in the county of New Castle and State of Delaware, have invented a new and useful Improvement in Preserving Canned Fruits and Vegetables; and I do hereby declare that the following is a full and exact description thereof.

The nature of my invention or discovery consists in rendering sulphite of lime immediately soluble in combination with fruit-juice, or tomato-juice, for the purpose of uniformly preserving fruit and tomatoes in combination with their own juices, or for making a preserving-liquor, to be used either hot or cold, for preserving fruit and tomatoes, either with or without heat, and with or without being hermetically sealed.

I am aware that sulphite of lime has heretofore been used to arrest fermentation in fruit-juices; but then it has been comparatively an insoluble article in combination with the juice. In other words, the process by which it is taken up, as ordinarily used, is very slow, while the fermentation in the fruit or juice is very rapid, and that, hence, it has been found necessary to use a quantity of the sulphite to arrest fermentation greatly in excess to obtain enough soluble that would immediately combine with the acid, while the balance—perhaps nine-tenths—is deposited in the bottom of the preserving-vessel in a comparatively insoluble state. After it is deposited it is gradually taken up as long as there is any acid in the fruit-juice for it to combine with, and, unless the juice is separated from it at the proper time, it will become entirely tasteless and ruined by the surcharge of the sulphite.

To get rid of this difficulty, the plan has been practiced to separate the juice from the insoluble sulphite when it was thought the fermentation was arrested, and preservation has in that way been accomplished; yet this is a very unsafe and uncertain mode of proceeding. If, on the other hand, the requisite amount of sulphite only were used to prevent fermentation, the object would not be accomplished, on account of the fact that before perhaps one-fourth of the quantity had been taken up by the juice the latter would ferment and spoil.

The object of my invention is to obviate these difficulties, so as to use only the requisite amount of sulphite for the preservation of the fruit in a certain and uniform way.

After experimenting with sulphite of lime for nearly three years I have discovered that it can only be safely used when combined with the juices of fruit or tomatoes that have been expressed or exuded by heat; that plain pared fruits, put into jars and covered with a sirup of sugar and water, and an excess of sulphite of lime used, will not be preserved, on account of the want of juice for the sulphite to combine with, and that consequently the greater portion of the sulphite will settle to the bottom of the jars, and the fruit ferment and spoil.

I have also found, when I placed pared or solid fruits in jars, and covered them with sugar-and-water sirup, and dissolved an ample quantity of sulphite in each jar, and set the latter, in a kettle of cold water, over the fire until the contents came to a boiling-heat, and then removed the jars in the usual mode of putting up hermetically-sealed fruits, that the sulphite had not become soluble, but was deposited in the bottoms of the jars as soon as the sirup became settled. The result was that about eight jars out of ten were spoiled by fermentation.

I also found that when I heated the fruit in a preserving-kettle to boiling-heat and placed it in jars of equal size, and at the same time added an equal quantity of the sulphite to each jar, the sulphite would not become soluble, but would be deposited in minute particles over the fruit and in the bottoms of the jars; and, notwithstanding each jar of fruit had been treated in precisely the same manner in every respect, there would be no uniformity in the result of the operation upon the fruit. Some jars would keep properly, some would spoil from fermentation, and others, in the course of a few months, would become soft and tasteless from imbibing an excess of sulphite. And when I placed the fruit over a fire in a preserving-kettle, and dissolved in water the requisite amount of sulphite and poured over it, the sulphite would always have a rapid tendency to settle to the bottom of the vessel. This I found to be the want of fruit-juice for it to combine with, and, although I brought the fruit to a boiling-heat and placed it in jars, the sulphite would not become soluble, and the fruit-liquor would become of a milky-white color, and would soon be deposited over the fruit and in the bottoms of the jars, and there would be no better uniformity in the result of the operation than in the preceding cases unless the fruits were soft and juicy. In such case a less number of jars would be spoiled by fermentation.

I finally found that when I allowed the fruit to boil in connection with the sulphite for ten or fifteen minutes I obtained much better and more uniform results than in any other way, with a much less quantity of sulphite, but the reason of which I could not discover for a long time. I finally came to the conclusion that the great difficulty in preserving with uniformity with sulphite of lime was on account of its comparative insolubility and the necessity for juice for it to unite with; also, that if fermentation were arrested the fruit would most likely be spoiled by an excess of the sulphite gradually taken up, and that the reason why some jars of fruit kept properly, while others spoiled from fermentation and others became soft and tasteless, was as follows: If a jar of fruit at the time it was put up contained enough hot juice to unite with a sufficient quantity of sulphite to arrest fermentation, and there was no considerable excess of juice, the fruit would be properly kept. On the other hand, if a jar contained nearly all fruit and but little juice, and consequently enough sulphite was not taken up to arrest fermentation, the fruit would spoil. Again, if the jar contained an excess of juice, it would take up an excess of sulphite and become tasteless.

From these conclusions I discovered that the reason why I obtained more uniform and better results when the fruit was allowed to boil for ten or fifteen minutes, in connection with the sulphite, was in consequence of the fact that a larger quantity of juice was exuded to combine with the sulphite, and also that by continuing the heat I caused the sulphite to be taken up and rendered soluble by the acids of the fruit, thereby causing uniformity of results.

Being satisfied that the above conclusions were correct, I adopted the following method, which constitutes my discovery, viz: I place the fruit in a preserving-kettle or in jars over the fire, and allow it to gradually heat until it comes to a boil, which causes a considerable quantity of juice to exude. I then take a portion of the hot fruit-juice and dissolve in it the sulphite, and then gradually pour it back over the hot fruit. The liquor then at once combines with the juice of the fruit. By continuing the heating process for ten or fifteen minutes, according to the kinds of fruit, perfect solubility takes place, and the liquor becomes comparatively clear, and an even and uniform preservation of the fruit takes place without any deposits of sulphite in the preserving-vessels.

Since I have discovered this mode of using the sulphite I have not lost a jar of fruit or tomatoes from fermentation nor from an excess of sulphite.

I have found the preservative property of the sulphite to be very great; but I have not yet discovered the exact amount of fruit that can be preserved with an ounce of sulphite thus rendered soluble; but I have successfully preserved with that amount as high as thirty-two quarts of pared fruit and an equal quantity of dressed berries, such as strawberries, raspberries, and blackberries, and as high as fifty quarts of dressed tomatoes, without having yet found the point at which its preservative capacity ceased.

In consequence of the necessity of boiling the fruit so long to obtain a uniformity of result it becomes softer than when sealed in the usual manner. I therefore make a preserving-liquor, to be used either hot or cold, for preserving fruit, fruit-juice, or tomatoes, either with or without heat, and hermetically sealed or otherwise put up in the following manner:

For preserving tomatoes, I take a given quantity of tomatoes, which I scald, peel, and cut open. I then squeeze out into a vessel all the juice and seeds that can be conveniently expressed with the hands. The tomatoes to be preserved I place in jars. I strain the liquor from the seeds. If I do not have enough to cover the tomatoes I take other tomatoes, which I cut up and place in a pan over the fire, and as the juice exudes dip up enough to cover the tomatoes in the jars. These hot tomatoes I then put in a jar. I then heat the tomato-liquor until it comes to a boil in a covered vessel, to prevent evaporation, and add to it as much sulphite as is required to preserve the tomatoes, and allow it to boil for fifteen minutes. I then pour it hot or cold over the tomatoes in the jars to preserve them. If they are hermetically sealed, or kept in a cold place to keep back fermentation until the sulphite operates, they will be preserved without heat; or the jars can be heated to a boiling-heat, to facilitate the action of the sulphite; or the tomatoes may be put into the liquor and heated to boiling-heat.

In preserving fruit I sugar down a given quantity of fruit for six or eight hours, and then place it with its juice in a preserving-kettle, and add to it more sugar and some water, if required, to obtain enough liquor to cover fruit which I have placed in jars in the same manner as the tomatoes above described. I add to this sirup and fruit, when it comes to a boil, as much sulphite as is necessary to preserve the cold fruit in the jars. I allow it to boil in a close vessel for fifteen minutes, and dip out the fruit from the liquor and put it into jars. The preserving-liquor thus obtained I use in preserving the fruit, in the same manner as the tomato-liquor in preserving the tomatoes.

For preserving cider or other fruit-juices cold, I take enough of the liquor to render soluble the requisite amount of sulphite to preserve the cask—say, at the rate of one ounce to ten gallons of liquor. This I render soluble by the mode above described, and then pour it into the cask. It should be kept in a cool place for a few days tightly bunged. There is no necessity to rack it off, except for the purpose of removing sediment at the bottom of the cask.

I am aware that a preserving-liquor cannot be made in the manner above described of very great strength; yet its strength will be ample for preserving purposes.

I am also aware that such liquor cannot be kept for a long time unless it is combined with other fruit or its juices, because its chemical properties will be exerted upon the juices already combined with it and its preservative properties destroyed.

What I claim as my invention, and desire to secure by Letters Patent, is—

1. The rendering sulphite of lime soluble for preserving purposes, substantially in the manner hereinbefore described.

2. The manufacture of a liquor, as above described, for preserving fruit and tomatoes either hot or cold, the same being hermetically sealed or not, as above set forth.

In testimony that the above is my invention or discovery I have hereunto set my hand and affixed my seal this 1st day of December, 1868.

E. R. NORNY. [L. S.]

Witnesses:
STEPHEN USTICK,
JOHN WHITE.